United States Patent [19]
Rydberg

[11] 3,730,218
[45] May 1, 1973

[54] NON-RETURN VALVES
[75] Inventor: Sverker Rydberg, Mantorp, Sweden
[73] Assignee: System Research Inc., New York, N.Y.
[22] Filed: June 26, 1970
[21] Appl. No.: 50,277

[30] Foreign Application Priority Data
July 2, 1969 France..................................6922367

[52] U.S. Cl................................................137/525
[51] Int. Cl..............................................F16k 15/14
[58] Field of Search..............137/525, 525.3, 525.5, 137/525.7

[56] References Cited
UNITED STATES PATENTS

| 2,722,896 | 11/1955 | Hayes | 137/525 X |
| 3,356,100 | 12/1967 | Seeler | 137/525 X |
| 1,967,418 | 7/1934 | McPhail | 137/525 X |
| 2,747,609 | 5/1956 | Sekera | 137/525.3 X |
| 3,297,048 | 1/1967 | Imhof | 137/525 X |

FOREIGN PATENTS OR APPLICATIONS

| 865,415 | 7/1949 | Germany | 137/525 |
| 409,227 | 4/1934 | Great Britain | 137/525.5 |
| 367,456 | 1/1939 | Italy | 137/525 |

Primary Examiner—Robert G. Nilson
Attorney—Ralph E. Bucknam, Jesse D. Reingold, Robert R. Strack and Henry A. Marzullo, Jr.

[57] ABSTRACT

A non-return valve with closure means comprising two movable valve members, one of which is a diaphragm adapted to open rapidly at extremely slight pressures and to seal rapidly at back pressures, while the other valve member is a cover adapted to protect the diaphragm at relatively high back pressures in order to assure sealing engagement also at such conditions.

5 Claims, 2 Drawing Figures

NON-RETURN VALVES

This invention relates to a non-return valve of the type having a preferably circular diaphragm of elastic material such as rubber, said diaphragm having the shape of a concave-convex lens the concave side of which faces a planar seat.

The general object of this invention is to provide an improved pressure operated non-return valve which will open at extremely slight pressures and which is adapted to close rapidly at slight back pressures and to withstand even relatively high back pressures without collapse of the diaphragm.

Another object of the invention is to provide an inexpensive, efficient non-return valve of the type described.

Still another object of the invention is to provide a non-return valve by which it is possible to reduce the pressure difference necessary for opening the valve, and particularly to fractions of 1 mm water column.

Accordingly, it is an object of the invention to provide a non-return valve comprising a base member provided with a valve port and a valve seat surrounding said port, and a closure means including a pressure operated diaphragm supported on said valve seat and a cover supported above the diaphragm. The diaphragm is formed of elastic material into the shape of a concave-convex lens which in closed valve position sealingly engages said valve seat with its margin and with the concave side of the diaphragm facing the valve port. The valve comprises first connecting and supporting means movably connecting the cover to the diaphragm, the cover being formed with a surface facing the diaphragm and adapted in the operative position thereof to press the diaphragm against the valve seat. The valve includes second connecting and supporting means for connecting the cover to the base member and for supporting the cover, in inoperative position, at a predetermined distance from the valve seat, the diaphragm having an extremely thin marginal portion which is adapted to be seated and unseated by extremely light positive pressure difference acting on the convex and concave side, respectively, of said diaphragm. The connecting means are formed of elastic material and are dimensioned and constructed in such a manner as to permit a positive pressure difference on the convex side of the diaphragm and on the outer side of the cover to deform the diaphragm in an inward direction towards the valve port to move the cover into engagement with said diaphragm to press it against the valve seat and by covering the latter, relieve the pressure load on said diaphragm.

Another object of the invention is to provide a non-return valve of the type described, in which said supporting and connecting means for connecting said cover to said base member and for supporting said cover comprise at least one pair of diametrical U-bent elements of elastic material.

Still another object of the invention is to provide a non-return valve of the type described, in which said supporting and connecting means for connecting said cover to said base member and for supporting said cover comprise at least one pair of diametrical U-bent elements of elastic material, said elements being formed with weakened portions such as holes.

A further object of the invention is to provide a non-return valve of the type described, in which said first connecting and supporting means for connecting the cover to said diaphragm and for supporting said cover comprise an extension on the convex face of said diaphragm; said cover having a recess in the side thereof facing said diaphragm; and a head at the end of said extension received in said recess, said extension being adapted to draw said cover nearer the valve seat whenever said diaphragm is deformed by a pressure acting on the convex side thereof, and in which said second connecting and supporting means are adapted to allow said pressure to force the cover against the diaphragm for relieving the pressure load thereon.

Particularly useful embodiments of the non-return valve are characterized in that the seat is formed by the flat end surface of a plug of elastic material such as rubber, said plug having a central bore in communication with said valve port and in which there can be fixed an externally threaded tubular socket.

Characteristic of a non-return valve of this type is that it operates at relatively slight pressure differences and ensures a perfect seal in spite of a relatively high back pressure.

It has been found desirable, however, to further reduce the pressure difference necessary for opening the valve.

The pressure difference necessary for opening the valve, according to this invention, is a function of the stiffness of the elastic supporting and connecting means, such as the proportion of the diameter of the through holes to the sections of the elastic supporting and connecting elements. One advantage of the invention is that the valve closure means is able to operate very rapidly and is nevertheless able to withstand high back pressure without collapse of the diaphragm.

These and further features of, as well as the advantages gained by the invention will become apparent from the following description in which reference is made to the accompanying drawings in which.

Figure 1:
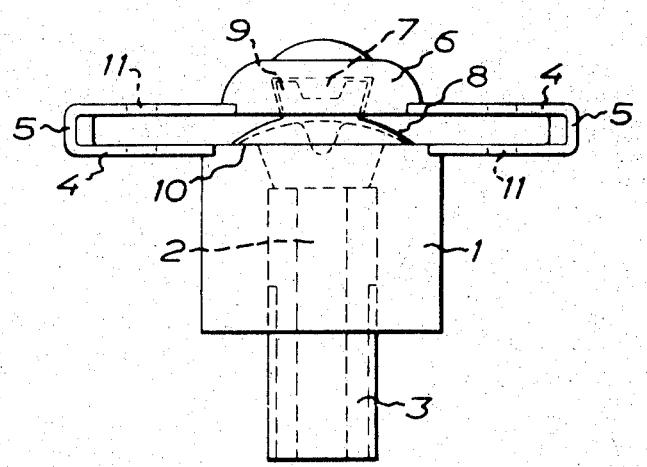
FIG. 1 is a side view of an embodiment of the non-return valve according to the invention.
Figure 2:
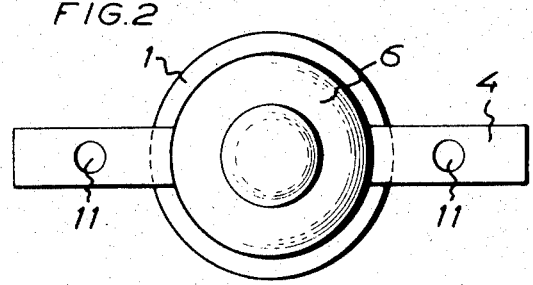
FIG. 2 is a plan view thereof.

The valve comprises a base member in the form of a material having an elasticity similar to rubber and with a central hole 2 in it. An externally threaded tubular socket 3 of metal or hard synthetic plastic is inserted in the hole 2. The upper end of this hole 2 serves as a valve port and is surrounded by a planar surface 10 at the upper end of the plug. This planar surface 10 serves as a valve seat. The plug 1 has a flat outer end and two laterally projecting U-shaped elements or tongues 4 which at a given distance from the edge of the plug 1 are provided with stiffening webs in the bend 5 of the U. The upper limb of each tongue 4 extends inwardly to and is connected with a cover 6 in the form of a cup of relatively thick and rigid material, such as plastic, while the lower limb of each tongue extends to and is connected with the plug 1. At least that side of the cover 6 facing the plug consists of an elastic material, preferably with an elasticity similar to rubber, and preferably it has a flat inner side. The cover is attached to the tongues in such a way as to be kept at a certain distance from the outer smooth face 10 of the plug 1 when the cover 6 is not subjected to load.

At its inner side the cover 6 has a central recess 7 which conically widens inwardly.

As shown in FIG. 1 there is seated on the valve seat 10 of the plug 1 a diaphragm 8 of a material having an elasticity similar to rubber and shaped as a concave-convex lens, the concave side of which faces the flat valve seat 10. The diaphragm 8 has an extremely thin marginal portion the edge of which engages the valve seat 10 in closed valve position. The diaphragm 8 is provided on its outer side with a projection 9 in the form of an inverted frusto-conical shank fitting the recess 7. The diameter of the projection 9 is not critical but is preferably smaller than that of the hole 2. The diameter of the diaphragm 8 is of course larger than that of the hole 2 but is smaller than that of the outer face 10 of the plug 1.

As shown on the drawings there is formed in each limb of each U-bent tongue 4 a weakening hole 11 the function of which will be described below.

The non-return valve described above functions as follows:

In its unloaded state the diaphragm 8 is maintained by the projection 9 in a position in which it engages the outer face 10 of the plug with its extremely thin marginal portion. When a pressure is exerted on the inner side of said diaphragm 8, for example by a fluid to be discharged through the hole 2, the marginal portion of the diaphragm 8 is first unseated from said outer face 10 of the plug, and in case of a high flow rate and pressure the cover 6 and the entire diaphragm are also unseated. In the case of suction acting on the inner side of the diaphragm 8 the marginal portion thereof will sealingly engage the outer face 10 of the plug 1 even at an extremely slight pressure difference. When the pressure difference increases the projection 9 will move the cover 6 towards the outer face 10 of the plug 1, and the pressure will then force the cover 6 tightly against the diaphragm, whereupon the cover 6 will relieve the diaphragm of the entire pressure difference.

By providing the holes 11 in the tongues 4 it is possible to reduce the pressure difference necessary for opening the valve.

Of course the invention is not restricted to the embodiment described above and shown in the drawings since various modifications may be resorted to within the scope of the appended claims.

What I claim and desire to secure by Letters Patent is:

1. A non-return valve comprising a base member provided with a passage, a planar member above said passage serving as a valve seat, a diaphragm supported by said planar member, said diaphragm consisting of a concave-convex member of elastic material, said diaphragm having a thin marginal portion and being wider than said passage, a cover element supported above the diaphragm, first elastic means connecting said cover element to the diaphragm and supporting the cover element, second elastic means for supporting the cover element and for connecting said cover element to said base member, said second means comprising at least one pair of U-bent elements, the diaphragm being responsive to small pressure differences, being seated against said planar member under the action of a positive pressure on its convex side and being unseated therefrom, while the cover is being held at a predetermined distance under the action of pressure on the inner concave side of said diaphragm.

2. A valve according to claim 1 wherein said U-bent elements are diametrical.

3. A valve according to claim 1 wherein each of said U-bent elements contains a hole.

4. A valve according to claim 1 wherein said first elastic means comprise a projection on the convex surface of the diaphragm and a recess on the cover element, said projection being adapted to engage with said recess to draw the cover element closer to said planar member under the effect of pressure on the convex side thereof.

5. A valve according to claim 4 wherein said projection has diameter smaller than the passage within said base member.

* * * * *